United States Patent Office 2,891,080
14α-HYDROXY-9α HALO HYDROCORTISONE
AND INTERMEDIATES Barry M. Bloom, Donald A. Kita, and Gerald D. Laubach, Jackson Heights, and Gilbert M. Shull, Huntington Station, N.Y., assignors to Chas. Pfizer & Co., Inc., Brooklyn, N.Y., a corporation of Delaware No Drawing. Application January 28, 1955
Serial No. 484,827

3 Claims. (Cl. 260—397.45)

This invention is concerned with a method for the preparation of new synthetic steroid compounds having cortical steroid activity and with the compounds prepared by this method. It is also concerned with a variety of intermediate products formed in the synthesis of the cortical steroid active materials.

The present invention consists of a method of preparing $\Delta^4$-9α-halopregnene-11β,14α,17α,21-tetrol-3,20-dione and its 21-esters and ethers. These compounds are prepared by a series of steps from a known starting material, namely $\Delta^{4,9(11)}$-pregnadiene-17α,21-diol-3,20-dione. The latter compound is available by dehydration, preferably under acidic conditions, of hydrocortisone. The series of steps which are utilized for the preparation of the valuable new compounds of this invention are outlined below. It should be pointed out that the compound $\Delta^4$-9α-fluoropregnene-11β,14α,17α,21-tetrol-3,20-dione and its various derivatives, such as esters, are valuable since they possess a high order of cortical steroid activity. That is, they have many of the properties of hydrocortisone, but, in addition, they are appreciably more active and more prolonged in their activity in the treatment of conditions such as rheumatoid arthritis or other inflammatory conditions which are susceptible to treatment by hydrocortisone.

The process of the present invention may be outlined diagrammatically as follows:

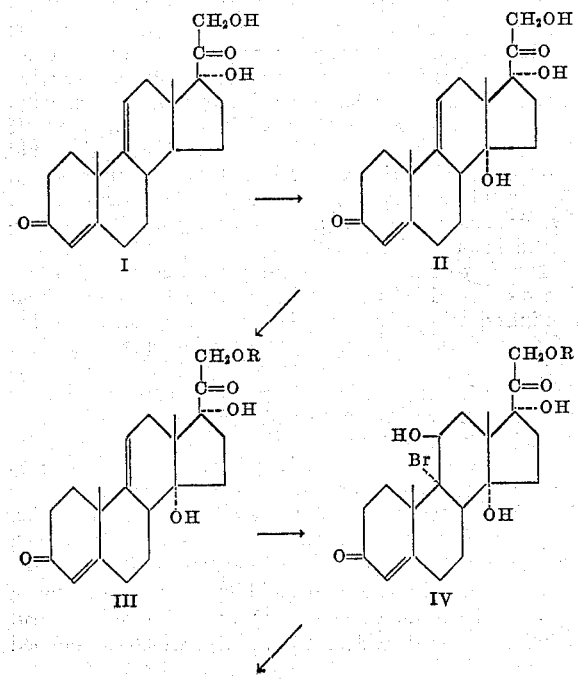

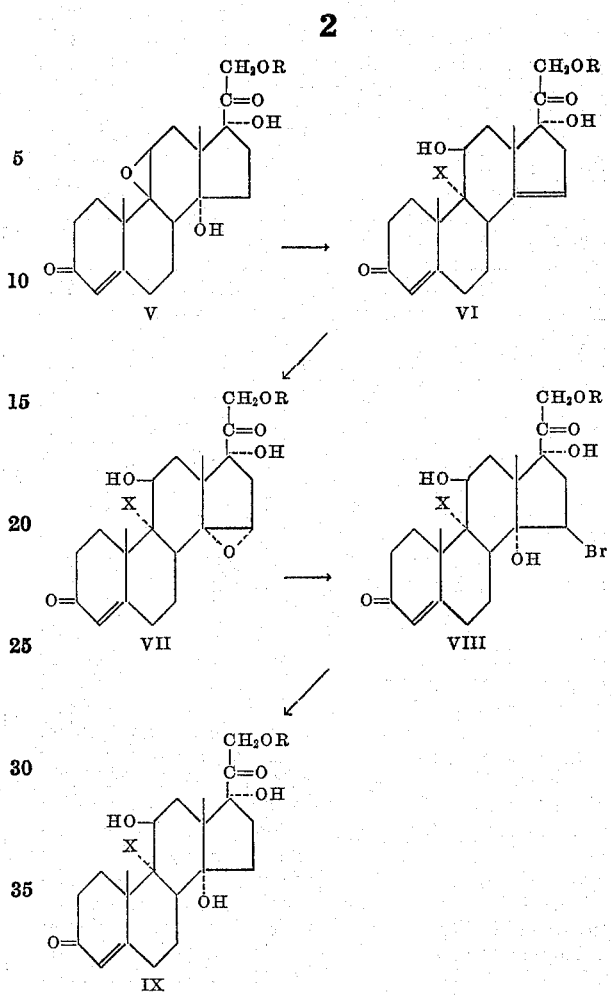

In the formulas above R is a carboxylic acid group, preferably one having 1 to 10 carbon atoms; however, appreciable variation may be made in this structural unit. Such esters as the formate, acetate, propionate, butyrate, benzoate, phthalate, succinate, and so forth may be utilized. In the above formulas, X is chlorine or fluorine.

In carrying out the first step of the present process, that is, the conversion of I to II, the process utilized is one of biological oxygenation using the oxygenating activity of a microorganism, preferably one of the genus Curvularia. A process of this nature is described in U.S. Patent No. 2,658,023. In operating this process, compound I ($\Delta^{4,9(11)}$-pregnadiene-17α,21-diol-3,20-dione) is added to a fermentation medium which has previously been sterilized and then inoculated with the chosen culture of Curvularia. The mixture is then incubated under aerobic conditions resulting in the introduction of a hydroxyl group at the 14-position of the molecule. It should, however, be noted that in addition to the introduction of an hydroxyl group at the 14-position, a certain amount of compound is formed consisting of the 9,11-epoxide derivative of compound I and also a certain amount of compound consisting of the 9,11-epoxide-14-hydroxylated compound. These products may be readily separated by extraction of the mixture of materials from the reaction by means of a selective solvent, for instance, a halogenated lower hydrocarbon, e.g. chloroform, methylene chloride, trichlorethylene, and so forth. The mixture of products may then be applied to a chromatographic column, preferably one of silica gel, carbon, or activated alumina and the column may then be developed utilizing an aromatic hydrocarbon such as benzene with increasing volumes of a polar solvent, such as ethanol or methanol. Fractions may be removed from the effluent and checked to determine when a suitable product is obtained. It should also be noted that the two by-products of the present reaction, that is, the 9,11-epoxide and the 9,11-epoxide-14-hydroxy compound, are also valuable intermediates which may be utilized in the preparation of biologically active steroid compounds. For instance, by treatment of the epoxido-hydroxy compound with hydrogen bromide in an anhydrous solvent, e.g. chloroform, there is formed an active product, that is, the 11$\beta$,14-dihydroxy-9-bromo compound, which has appreciable adrenal cortical activity of itself. The $\Delta^{9(11)}$,14-hydroxy product may be purified by rechromatographic purification, for instance, over a Florisil column. This material, upon evaporation of the solvent, is obtained as a crystalline product. Recrystallization from ethyl acetate gives a product melting at 190.8 to 194.2° C. A sample of this material, in a potassium bromide pellet, showed infrared absorption maxima at 2.96, 3.06, 5.87, 6.01, and 6.22$\mu$.

The next step of the process outlined above, that is, the conversion of compound II to compound III, consists in esterification of the 21-hydroxyl. Since this group is the only primary hydroxyl group in the molecule, it may be selectively esterified with a variety of esterifying agents including acid chlorides of aliphatic and aromatic acids, acid anhydrides of various types, and other reagents of this nature. The reaction may be conducted in an inert solvent or preferably in a tertiary organic base, such as pyridine, dimethylaniline, diethylaniline, quinoline, and so forth. For instance, the treatment of compound II ($\Delta^{4,9(11)}$-pregnadiene-14$\alpha$,17$\alpha$,21-triol-3,20-dione) with a mixture of acetic anhydride and pyridine at room temperature overnight affords the 21-monoacetate. This product may be obtained in crystalline form by addition of the reaction mixture to water and neutralization. The ester has a melting point of 190.8 to 192° C. In ethanol it displays an ultraviolet absorption maximum at 238 m$\mu$ of $\epsilon$ 16,600. A sample in a potassium bromide pellet displays infrared maxima at 2.96, 3.03, 5.75, 5.80, 6.10, 6.20, and 8.16 microns. The compound has an optical rotation of $[\alpha]_D^{25} +138° \pm 3°$, when dissolved in dioxane at a concentration of 1%.

*Analysis.*—Calcd. for $C_{23}H_{30}O_6$: C, 68.61; H, 7.52. Found: C, 68.98; H, 7.74.

The next step in the present process, that is, the conversion of compound III to IV, consists of the treatment of compound III ($\Delta^{4,9(11)}$-pregnadiene-14$\alpha$,17$\alpha$,21-triol-3,20-dione-21-ester) with a reagent capable of introducing selectively the elements of hypobromous acid at the isolated double bond present at the 9(11)-position of the molecule. A most useful reagent for conducting this reaction step is an N-brom lower alkyl amide or an N-bromo dicarboxylic acid imide. These compounds, such as N-bromoacetamide, N-brompropionamide, N-bromsuccinimide, and so forth, may be utilized in a medium consisting of water and a stable organic solvent which is miscible with water. For instance, a mixture of dioxane and water is particularly effective. A small amount of a strong acid present in the mixture, preferably oxidizing acid, such as perchloric acid, appreciably assists in inducing the reaction. The 9-bromo-11-hydroxy compound thus formed may be isolated, for instance, by treatment of the reaction mixture with a reagent to neutralize or combine with the strong oxidizing acid that is used and which will remove excess reagent. This is followed by removal of the solvent, e.g. by careful evaporation. The product may be purified by crystallization from solvents such as mixtures of ethyl acetate and ether.

It should be noted that this intermediate also has appreciable cortical steroid activity itself.

The next stage of the present process is conducted by contacting compound III, that is, the 9-bromo-11-hydroxy compound with a dehydrobrominating agent to convert this material to the 9,11-epoxide. Various alkali metal or alkaline earth metal salts of organic acids, such as potassium acetate, potassium propionate, potassium formate, and various other materials of this nature are effective. Certain organic bases, preferably tertiary amines, are also effective for conducting this process. The starting material, that is, bromhydrin, is preferably heated in the presence of the dehydrobrominating agent and most successfully in an organic solvent. For instance, the reaction may be conducted with a mixture of potassium acetate and acetic acid. This is particularly effective in dehydrobrominating the material to form the corresponding epoxide. After removal of salts and excess dehydrobrominating agent, if any is utilized, the epoxide may be isolated. This compound may be recrystallized and obtained in highly purified form. It has a characteristic absorption spectrum in the ultraviolet.

In the next step of the present process compound VI is prepared by treating compound V ($\Delta^4$-9,11$\beta$-epoxido-pregnene-14$\alpha$,17$\alpha$-diol-3,20-dione) that is, the epoxide, with a hydrogen halide chosen from the group consisting of hydrogen fluoride and hydrogen chloride under anhydrous conditions in an inert organic solvent, that is, one unaffected by the reagent. Various halogenated lower aliphatic hydrocarbons are particularly useful for this purpose. These include chloroform, methylene chloride, trichlorethylene, and so forth. The reaction is preferably conducted at a low temperature, that is, from about 0° to about 10° C. and usually requires several hours exposure of the epoxide to the reagent to result in the conversion of the desired new intermediate compound. During the process there is appreciable dehydration of the steroid nucleus at the 14,15-position; that is, the hydroxyl group at the 14-position and the hydrogen at the 15-position are split out as a molecule of water. The new compound, compound VI (e.g. $\Delta^{4,14}$-9$\alpha$-fluoropregnadiene-11$\beta$,17$\alpha$,21-triol-3,20-dione) above, may be isolated from the reaction mixture by carefully removing excess reagent and removal of the solvent, for instance, by distillation under vacuum. The residual material thus obtained may be purified by recrystallization from a suitable solvent or mixture of solvents, for instance, ethyl acetate, or mixtures of ethyl acetate and diethyl ether. Compound VI thus obtained is a useful intermediate, as noted above, for the preparation of the desired biologically active products. However, compound VI itself possesses appreciable biological activity, that is, it has appreciable cortical steroid-type activity. (It should be noted that in addition to compound VI there is also formed a certain amount of the desired end product of this series of reactions, that is, compound IX. By careful separation of the mixed product, for instance, by chromatography on alumina, compound IX is obtained in purified form.)

The next stage of the present process consists of treating compound VI above with a peracid to bring about the introduction of an epoxide group at the 14,15-position of the molecule. A variety of peracids may be utilized for this purpose. These include, performic acid, peracetic acid, perphthalic acid, perpropionic acid, and so forth. The process is preferably conducted in an inert organic solvent such as chloroform or another one of the lower aliphatic halogenated hydrocarbons. The reaction is preferablby conducted at a low temperature, that is, from 0 to about 10° C., to avoid side reactions which may occur during its course. The product that is formed, that is, the 14,15-epoxido compound is isolated by the careful removal of excess peracid by means of a reducing agent and careful concentration of the organic solvent solution of the epoxide. The product which is obtained in crude form may be recrystallized from solvents such as ethyl acetate.

The next step of the present process of making biologically active compounds is the treatment of compound VII ($\Delta^4$ - $9\alpha$ - halo - $14,15\alpha$ - epoxidopregnene - $11\beta,17\alpha,21$-triol-3,20-dione) with hydrogen bromide to form the corresponding $14\alpha$-hydroxy-$15\beta$-bromo compound, that is, compound VIII above ($\Delta^4$-$9\alpha$-halo-$15\beta$-bromopregnene-$11\beta,14\alpha,17\alpha,21$-tetrol-3,20-dione). This is accomplished by the treatment of the epoxide with hydrogen bromide, preferably in an inert organic solvent, such as chloroform, methylene chloride, or other lower aliphatic halogenated hydrocarbon. The reaction is preferably conducted at a low temperature, that is, from about 0 to about 10° C. It requires several hours to complete the process whereafter the product may be isolated by careful removal of excess hydrogen bromide with a mild alkaline reagent and the product then may be isolated from the organic solvent solution by concentration. The crude product may then be recrystallized to obtain the highly purified 14,15-bromhydrin.

The next step of the present process is conducted by contacting compound VIII with Raney nickel and hydrogen to effect the selective removal of the 15-bromo group and replacement by a hydrogen. This reaction may be conducted in an inert organic solvent, such as ether, ethyl acetate, dioxane, or other solvents of this nature. It may be conducted at room temperature or at a slightly elevated temperature and, after approximately one mole of hydrogen has been absorbed, the reaction may be terminated. After removal of the catalyst from the reaction mixture, the product may be isolated by concentration of the solvent solution under vacuum and the isolated product may be purified by crystallization from a suitable solvent. This product, that is, compound IX ($\Delta^4$-$9\alpha$-fluoropregnene-$11\beta,14\alpha,21$-tetrol-3,20-dione) in the scheme above, is highly active as an anti-inflammatory agent. It may be administered by various routes, for instance, by intro-articular injection. Alternatively, ointments or finely divided suspensions containing the active material may be utilized for treatment of inflammatory conditions of the eyes or other body tissues. These preparations may be combined with various antibiotics to achieve suppression of bacterial infections with simultaneous inhibition of inflammatory reactions by the present compounds.

It should be noted that, although compound IX is particularly active as a cortical steroid-type compound, all of the compounds whose structural formulas are given in column 1, lines 45–65, column 2, lines 5–25 that is, compounds II through VIII, are all active to a certain extent in this manner. Furthermore, the by-products obtained in the steroid biooxygenation of compound I to II, that is, the 9,11-epoxide and the 9,11-epoxide-14-hydroxy compound, are also biologically active, that is, they have steroid cortical hormone-type activity. Where an intermediate or final product is obtained in ester form, it may readily be hydrolyzed to the corresponding 21-alcohol. Since some of the compounds are sensitive to alkalies, it is then advisable to use acid hydrolysis.

Since the last few stages of the present process are conducted with the 21-hydroxy group of the steroid molecule in esterified form, the final product is obtained initially in the form of an ester. These esters may be hydrolyzed readily to the alcohol by treatment with a mild alkaline agent in a solvent, preferably a polar, water-miscible solvent, in the presence of at least a small amount of water. For instance, the ester may be treated with potassium bicarbonate in a mixture of methanol and water. The reaction may be conducted at room temperature and hydrolysis of the ester is generally completed within a few hours. The alcohol may then be isolated by addition of water to the mixture and removal of the solvent. In general, approximately one molecular quantity of the alkaline material is all that is needed. However, if an acid ester of the end product, that is, an ester of compound IX with a dicarboxylic acid or other polycarboxylic acid is utilized, it will be necessary to use more than one molecular proportion of the alkaline material, since the acid groups of the polycarboxylic acid also utilize some of the alkaline material. After hydrolysis and isolation of the alcohol, various other esters may be prepared from the alcohol by the common methods of esterification. However, care should be exercised not to degrade the product during the esterification process. Thus, aqueous acid conditions should be avoided, since this may lead to dehydration, particularly of the 14-hydroxyl group of the molecule. Furthermore, various ethers may be prepared from the alcohol by treatment of the alcohol with the appropriate etherifying agent. For instance, materials such as diazomethane may be utilized for this purpose. Alternatively, methyl iodide in the presence of a mild alkaline agent such as potassium carbonate or other agent such as ethyl iodide, propyl iodide, benzyl bromide, and so forth may be utilized.

The following examples are given by way of illustration and are not to be considered as the sole embodiments of this invention. It is to be understood that protection hereof is only to be limited by the specific wording of the appended claims.

Example I

A nutrient solution was prepared containing a carbohydrate, protein hydrolyzate, and a mixture of inorganic salts. This solution was sterilized and seeded with a culture of *Curvularia lunata*. After incubation at 30° C. for 24 hours, a solution of $\Delta^{4,9(11)}$-pregnadiene-$17\alpha,21$-diol-3,20-dione in the minimum volume of acetone was added, under sterile conditions, to the fermentation mixture. One-half gram of the steroid compound was utilized for each liter of fermentation broth. The fermentation was continued under aerobic, stirred conditions for a further 30 hours. The fermentation broth was then filtered utilizing a small volume of diatomaceous earth filteraid. The filtered aqueous fermentation broth was then passed through a column of granular carbon. The steroid products were absorbed on the carbon. After washing the adsorbed steroils with a small volume of water, the tower was washed with a mixture of equal volumes of benzene and methanol. The active material was obtained by concentrating under vacuum the solvent eluate from the resin tower. The oily residue was dissolved in a small volume of benzene and the mixture was applied to a Florisil column. The column was developed by means of a mixture of benzene containing gradually increasing volumes of methanol, beginning with 1%. Paper chromatography was utilized to determine the fractions to be selected to obtain the desired product. The desired product, $\Delta^{4,9(11)}$-pregnadiene-$14\alpha,17\alpha,21$-triol-3,20-dione, was isolated and separated in purified form from the other products that were formed. These include $\Delta^4$-$9,11\beta$-epoxidopregnene-$17\alpha,21$-diol-3,20-dione and $\Delta^4$-$9,11\beta$-epoxidopregnene-$14\alpha,17\alpha,21$-triol-3,20-dione and certain other related products. The principal product was recrystallized from ethyl acetate and found to have a melting point of 190.8° to 194.2° C. Acetylation of this product with acetic anhydride in pyridine mixture gave the 21-acetate with a melting point of 190.8° to 192.0° C.

One of the by-products referred to above, that is, $\Delta^4$-$9,11\beta$-epoxidopregnene-$17\alpha,21$-diol-3,20-dione, was isolated through its acetate. Upon hydrolysis of the acetate with a mixture of potassium carbonate, methanol and water, the free alcohol was obtained. This product had a melting point of 192.2° to 195.0° C. It displayed maxima in the infrared at 2.93, 5.87, 6.09 and 6.23$\mu$ (potassium bromide pellet). It also displayed a maximum at 243 m$\mu$ in the ultraviolet region of $\epsilon$ 15,200 (dissolved in ethanol).

Example II

Sixty-seven (67) milligrams of $\Delta^{4,9(11)}$-pregnadiene-14α,17α,21-triol-3,20-dione 21-acetate was dissolved in a mixture of equal parts of dioxane and water. To the mixture was added three equivalents of N-bromacetamide. A few drops of dilute perchloric acid was added to the mixture. It was allowed to stand at room temperature for one hour. To the mixture was added dilute sodium sulfite solution to remove perchloric acid and any unreacted hypobromous acid. Saturated aqueous sodium chloride was also added to facilitate extraction of the product. The product was extracted with several small volumes of chloroform and the chloroform solution, after drying, was concentrated under vacuum to give a pale yellow oil. The oil was triturated with a mixture of ether and ethyl acetate and a crystalline solid was obtained. This was shown to be $\Delta^4$-9α-bromopregnene-11β,14α,17α,21-tetrol-3,20-dione 21-acetate.

Example III $\Delta^4$-9α-bromopregnene-11β,14α,17α,21-tetrol-3,20-dione 21-acetate was treated in ethanol solution with approximately 10 molecular proportions of anhydrous potassium acetate. The mixture was refluxed for two hours. It was then concentrated under vacuum at approximately room temperature. The product was then extracted from the residual salts with chloroform. The chloroform solution was washed with water and it was then concentrated under vacuum. The product, $\Delta^4$-9,11β-epoxidopregnene-14α,17α-diol-3,20-dione 21-acetate, was obtained in crystalline form. It was purified by recrystallization from ethyl acetate. The material had a melting point of 225.2° to 226.0° C. A pellet in potassium bromide was analyzed for its infrared absorption spectrum. It displayed maxima at 3.00, 5.80, 6.10, 6.24, and 8.11μ.

Example IV

A solution of $\Delta^4$-9,11β-epoxidopregnene-14α,17α-diol-3,20-dione 21-acetate in chloroform was cooled to 5° C. A solution of approximately one molecular proportion of anhydrous hydrogen fluoride in chloroform was cooled to the same temperature. The two solutions were mixed and the material was stored at 0° to 10° C. for four hours. The solution was then washed with water to remove all unreacted hydrogen fluoride. The chloroform solution was then concentrated under vacuum and a crude crystalline product was obtained. This material was dissolved in methylene chloride and chromatographed on a Florisil column using methylene chloride with increasing volumes of acetone to develop the column and then isolate the purified product, $\Delta^{4,14}$-9α-fluoropregnadiene-11β,17α,21-triol-3,20-dione 21-acetate.

Example V

The product of the previous reaction was dissolved in a small volume of ether. A solution of approximately two molecular proportions of perphthalic acid in ether was added. Ethyl acetate was added to completely dissolve the mixture. Approximately two to three moles of perphthalic acid was used. The mixture was allowed to stand at room temperature for 24 hours. It was then washed with a dilute solution of sodium hydrosulfite. This was followed by dilute sodium bicarbonate solution wash and then by water. The solution of the product in the mixture of organic solvents was concentrated under vacuum to obtain a crystalline product. This was then recrystallized from ethyl acetate to obtain purified $\Delta^4$-9α-fluoro-14,15α-epoxidopregnene-11β,17α,21-triol-3,20-dione 21-acetate.

Example VI

The product from the previous reaction was dissolved in anhydrous chloroform. This mixture was cooled to −10° C. A solution of approximately 5 molecular proportions of anhydrous hydrogen bromide in chloroform was similarly cooled to −10° C. The two solutions were mixed and stored at −10° C. for one hour. The chloroform solution was then washed with cold water until free of acid. The chloroform solution was then concentrated under vacuum and the product, $\Delta^4$-9α-fluoro-15β-bromopregnene-11β,14α,17α,21-tetrol-3,20-dione 21-acetate, was obtained as a viscous light yellow oil.

Example VII

The oil obtained as a product in the above reaction was dissolved in methanol at room temperature. Approximately twenty times its weight of Raney nickel was added. The mixture was heated to reflux under nitrogen and the mixture was refluxed for one-half hour. The solution was then cooled and the nickel catalyst was filtered. The clear methanol solution was then concentrated to dryness. The residual product was dissolved in warm chloroform. The mixture was then cooled to room temperature, washed several times with small volumes of water. The chloroform solution was concentrated under vacuum to obtain the solid product, that is, $\Delta^4$-9α-fluoro-pregnene-11β,14α,17α,21-tetrol-3,20-dione 21-acetate. This compound was shown to be highly active in standard tests for cortical steroid activity including the thymus involution test.

What is claimed is:

1. A process for the preparation of a compound having the structure

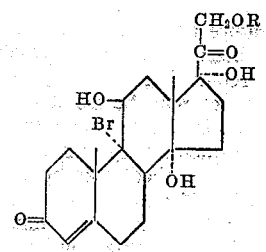

wherein R is a hydrocarbon carboxylic acid ester group having from 1 to 10 carbon atoms, which comprises contacting a compound having the structure

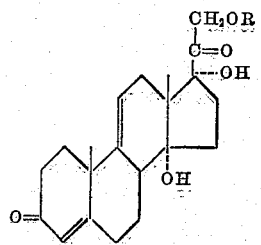

with an N-bromcarboxylic acid amide in the presence of water.

2. A compound having the structure

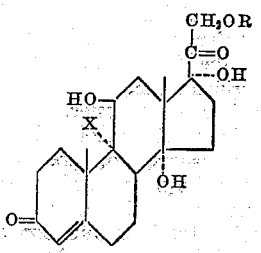

wherein X is a halogen atom chosen from the group consisting of bromine, chlorine and fluorine and R is selected from the group consisting of hydrogen and hydrocarbon carboxylic acid ester groups having from 1 to 10 carbon atoms.

3. A compound having the structure
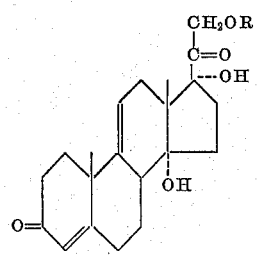
wherein R is chosen from the group consisting of an organic carboxylic acid and hydrogen.
References Cited in the file of this patent
UNITED STATES PATENTS
| | | |
|---|---|---|
| 2,658,023 | Shull | Nov. 3, 1953 |
| 2,695,260 | Murray | Nov. 23, 1954 |
| 2,703,799 | Bergstrom | Mar. 8, 1955 |
| 2,705,711 | Dodson | Apr. 5, 1955 |
| 2,707,711 | Hogg et al. | May 3, 1955 |
| 2,730,525 | Hogg | Jan. 10, 1956 |
| 2,745,784 | Shull et al. | May 15, 1956 |
| 2,752,372 | Reichstein | June 26, 1956 |
| 2,759,929 | Farrar | Aug. 21, 1956 |
| 2,783,255 | Shull et al. | Feb. 26, 1957 |
| 2,788,354 | Agnello et al. | Apr. 9, 1957 |

UNITED STATES PATENT OFFICE
CERTIFICATE OF CORRECTION

Patent No. 2,891,080                                                                June 16, 1959

Barry M. Bloom et al.

It is hereby certified that error appears in the printed specification of the above numbered patent requiring correction and that the said Letters Patent should read as corrected below.

Column 4, line 4, for "compound III" read -- compound IV --.

Signed and sealed this 17th day of November 1959.

(SEAL)
Attest:

KARL H. AXLINE
Attesting Officer

ROBERT C. WATSON
Commissioner of Patents